United States Patent
Maeshima

(10) Patent No.: US 9,470,388 B2
(45) Date of Patent: Oct. 18, 2016

(54) PART INSTALLATION STRUCTURE FOR VEHICLE

(71) Applicant: HONDA MOTOR CO., LTD., Tokyo (JP)

(72) Inventor: Kazuki Maeshima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 14/361,054

(22) PCT Filed: Nov. 27, 2012

(86) PCT No.: PCT/JP2012/080607
§ 371 (c)(1),
(2) Date: May 28, 2014

(87) PCT Pub. No.: WO2013/080965
PCT Pub. Date: Jun. 6, 2013

(65) Prior Publication Data
US 2014/0334176 A1    Nov. 13, 2014

(30) Foreign Application Priority Data

Dec. 1, 2011    (JP) ................................ 2011-264105

(51) Int. Cl.
*F21V 5/00*    (2015.01)
*F21S 8/10*    (2006.01)
(Continued)

(52) U.S. Cl.
CPC ......... *F21S 48/2206* (2013.01); *B60Q 1/0035* (2013.01); *B60Q 1/2638* (2013.01); *B62D 25/02* (2013.01); *F21W 2101/14* (2013.01)

(58) Field of Classification Search
CPC .. B60Q 1/0035; B62D 25/02; F21S 48/2206
See application file for complete search history.

(56) References Cited

U.S. PATENT DOCUMENTS 4,920,460 A * 4/1990 Mori .................... B60Q 1/0035
362/496

FOREIGN PATENT DOCUMENTS

| CN | 1590189 A | 3/2005 |
| CN | 102039935 A | 5/2011 |

(Continued)

OTHER PUBLICATIONS

Japanese Notification of Refusal dated Jan. 27, 2015, 3 pages.
(Continued)

*Primary Examiner* — Evan Dzierzynski
(74) *Attorney, Agent, or Firm* — Rankin, Hill & Clark LLP

(57) ABSTRACT

A design part installation structure includes a lamp body exposed on a vehicle design surface, an outer panel having an installation section for installing the lamp body and defining the design surface, and a parting line, which includes a curved third parting line segment, is formed between the lamp body and the outer panel. The outer panel has an orthogonal flange portion and an inclined flange portion. The orthogonal flange portion is provided in a section corresponding to the third parting line segment, extends from the installation section toward a vehicle inside, and is orthogonal to a main body. The inclined flange portion is provided in a section corresponding to the third parting line segment, extends from an extending end of the orthogonal flange portion toward the vehicle cabin, and inclines toward the lamp body as a position thereon shifts in the direction from vehicle outside to vehicle inside.

18 Claims, 7 Drawing Sheets

(51) Int. Cl.
*B60Q 1/26* (2006.01)
*B60Q 1/00* (2006.01)
*B62D 25/02* (2006.01)
*F21W 101/14* (2006.01)

(56) References Cited

FOREIGN PATENT DOCUMENTS

| CN | 201825119 U | 5/2011 |
|---|---|---|
| JP | S60-248482 A | 12/1985 |
| JP | H08-072609 A | 3/1996 |
| JP | 10-226360 | 8/1998 |
| JP | 2007-297000 | 11/2007 |
| JP | 2011-084169 | 4/2011 |

OTHER PUBLICATIONS

Japanese Notification of Reasons for Refusal dated Sep. 8, 2015.
International Search Report filed in PCT/JP2012/080607, date of mailing: Mar. 5, 2013.
Chinese Office Action dated Aug. 17, 2015, 6 pages.

* cited by examiner

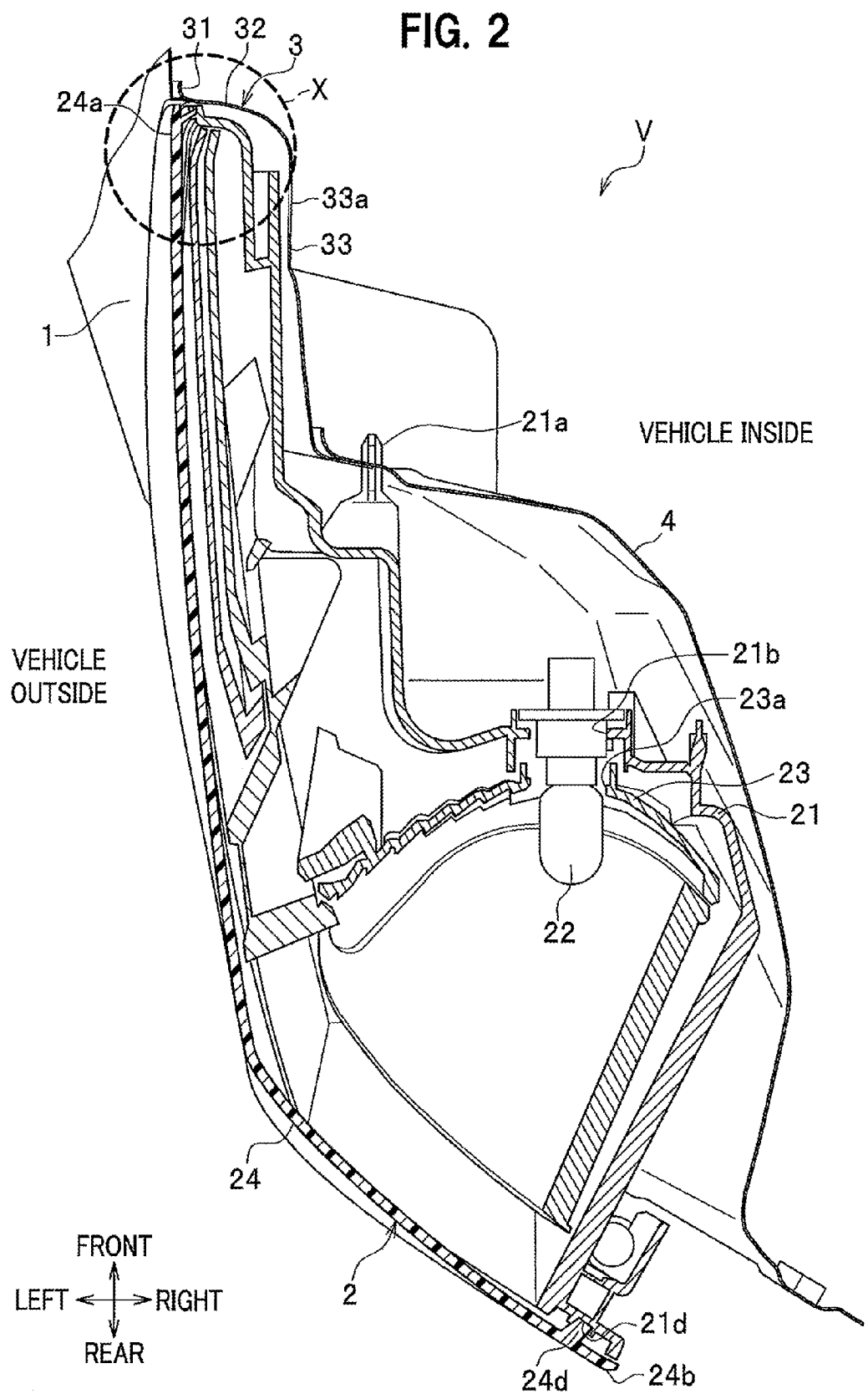

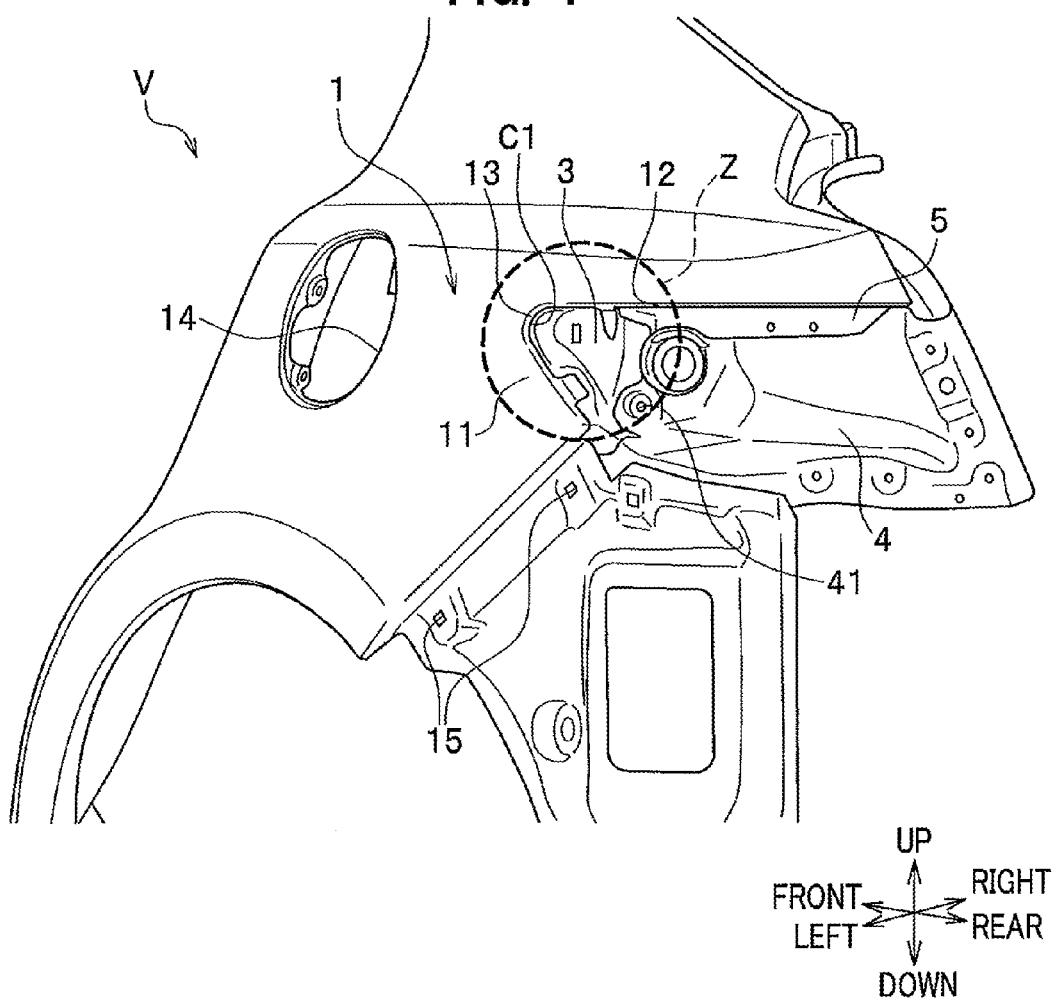

PART INSTALLATION STRUCTURE FOR VEHICLE

TECHNICAL FIELD

The present invention relates to a design part installation structure for vehicle.

BACKGROUND ART

Conventionally, the parting lines formed on the design surface of the vehicle have a large effect on the appearance design, and therefore various techniques such as equalizing widths of the parting lines or the like are performed thereon (for example, refer to Patent Document 1).

PRIOR TECHNICAL DOCUMENT

Patent Document

Patent Document 1: Japanese Patent Application Laid-Open Publication No. hei 9-216572

SUMMARY OF THE INVENTION

Technical Problem

Meanwhile, if a corner is formed between two members defining a parting line, the parting line includes a section of curved line (hereinafter, referred to as "the curved line segment"). In addition, if at least one of these two members is made of a panel member, it is necessary to press form a flange portion along the parting line in the panel member. The flange portion has a section corresponding to the curved line segment which increases its elongation percentage as the curvature of the curved line segment (the angle of the corner portion) becomes more acute. Also, the elongation percentage of the flange portion becomes larger as the height of the flange portion becomes larger. Further, the elongation percentage of the flange portion becomes larger as the angle of the flange portion relative to the main body of the panel member becomes smaller. Then, if the elongation percentage of the flange portion is large, the member is elongated significantly, which might result in cracks occurring when the member reaches its elongation limit. Thus, there has been a demand to decrease the elongation percentage of the flange portion, and simultaneously to increase the degree of freedom in designing the curvature of the curved line segment.

To satisfy such a demand, one can conceive of a method to arrange the flange portion to incline at an angle greater than 90 degree relative to the main body of the panel member. By this method, the elongation percentage of the flange portion becomes smaller. Also, even if a margin for connecting with another member is provided, the height of the flange portion becomes smaller, and thereby the elongation percentage of the flange portion becomes smaller. Therefore, even if the curvature of the curved line segment is reduced to a certain extent, the flange portion is formed preferably.

However, in this method, since the inclined surface of the flange portion is exposed to the vehicle outside from the curved line segment, the parting line in the curved line segment looks narrow, which creates an inequality between the width of the curved line segment and widths of the other sections (widths of gaps between two members) and thus might impair the appearance design. To hide the unequal parting line, one can conceive of providing a seal or the like. In this way, however, the cost and the number of manufacturing processes increase.

The present invention is made in view of the above, and aims at providing a design part installation structure for a vehicle capable of reducing the elongation percentage of the flange portion, while also increasing the degree of freedom for the curvature of the curved line segment.

Moreover, the present invention aims at providing a design part installation structure for a vehicle capable of suppressing the increase in the cost and the number of manufacturing processes, while also improving the appearance design.

Solution to Problem

To solve the problem, a design part installation structure for a vehicle according to the present invention, comprises:
  a design part exposed on a design surface of the vehicle;
  an outer plate panel including an installation section for installing the design part, the outer plate panel defining the design surface; and
  a parting line formed between the design part and the outer plate panel,
    wherein the parting line includes a curved line segment,
    wherein the outer plate panel comprises:
    an orthogonal flange portion disposed in a section corresponding to the curved line segment so as to extend from the installation section toward a vehicle inside, the orthogonal flange portion being orthogonal to the design surface; and
    an inclined flange portion disposed in the section corresponding to the curved line segment so as to extend from an extending end of the orthogonal flange portion toward the vehicle cabin, wherein the inclined flange portion inclines toward the design part as a position thereon shifts in the direction from a vehicle outside to a vehicle inside.

According to the present invention, in the section corresponding to the curved line segment, the inclined flange portion is provided at the extending end of the orthogonal flange portion, and thereby the elongation percentage at the distal end of the flange portion is reduced as compared to a case where the angle of the entire flange portion relative to the design surface is set at 90 degree. In addition, since the inclined flange portion is provided at the extending end of the orthogonal flange portion, the height of the entire flange portion including the orthogonal flange portion and the inclined flange portion is reduced, even if a margin for connecting with another member is provided, as compared to a case where the angle of the entire flange portion relative to the design surface is set at 90 degree. Thereby, even if the curvature of the curved line segment is acute, the flange portion is formed preferably.

In addition, according to the present invention, by providing the orthogonal flange portion between the design surface and the inclined flange portion, the width of the parting line (the width of the gap between the design part and the outer panel) is equalized. Thereby, the appearance design is improved, and a seal or the like as a hiding member becomes unnecessary so as to prevent an increase in the cost and the number of manufacturing processes.

Moreover, it is preferred that the design part installation structure for the vehicle is structured such that
  the parting line includes:
  a first parting line segment;

a second parting line segment extending in a direction crossing the first parting line segment; and a third parting line segment formed between the first parting line segment and the second parting line segment so as to define a curved line segment, wherein the orthogonal flange portion is disposed in sections corresponding to the first parting line segment, the second parting line segment and the third parting line segment, wherein an angle of the inclined flange portion relative to the orthogonal flange portion becomes smaller as a position thereon shifts from a point of the outer plate panel corresponding to a top of the third parting line segment at a center in a longitudinal direction thereof, toward the first parting line segment and the second parting line segment.

The point of the flange portion corresponding to the top at the center in the longitudinal direction of the third parting line segment has the largest elongation percentage, and the elongation percentage decreases as a position thereon shifts from the point corresponding to the top toward the first and second parting line segments. According to this structure, an angle of the inclined flange portion is set according to the elongation percentage of respective portions so as to preferably reduce the elongation percentage of the respective portions. That is, at the point corresponding to the top where the elongation percentage is relatively large, the angle of the inclined flange portion is increased to reduce the elongation percentage, whereas at the places adjacent to the first parting line segment and the second parting line segment where the elongation percentage is relatively small, the angle of the inclined flange portion need not be larger than necessary so as to reduce the effect on the appearance design.

Moreover, it is preferred that the design part installation structure for the vehicle is structured such that the inclined flange portion smoothly continues to the orthogonal flange portions, adjacent to the first and second parting line segments, of the outer plate panel.

According to this structure, since the inclined flange portion at the section corresponding to the third parting line segment smoothly continues to the orthogonal flange portions adjacent to the first and second parting line segments, no sharply bent portion is formed therebetween. Thereby, the elongation percentage of the flange portion at the time of press forming is reduced, and thereby the flange portion is formed preferably.

Moreover, it is preferred that the design part installation structure for the vehicle is structured such that the outer plate panel comprises a curved portion formed so as to curve between the orthogonal flange portion and the inclined flange portion.

According to this structure, the curved portion is formed so as to curve between the orthogonal flange portion and the inclined flange portion, and thereby the flange portion is structured to be bent gradually (gently) from the orthogonal flange portion over the inclined flange portion, so that no sharply bent portion is formed therebetween. Thereby, the elongation percentage of the flange portion at the time of press forming is decreased, and therefore the flange portion is formed preferably.

Moreover, it is preferred that the design part installation structure for the vehicle is structured to comprise a gutter panel including:

a gutter flange portion inclining along the inclined flange portion and connected to the inclined flange portion, a gutter side wall portion extending from a vehicle inside end of the gutter flange portion toward vehicle inside, and a gutter bottom wall portion extending from a vehicle inside end of the gutter side wall portion inwardly of the installation section, wherein the design part is a lamp body including:

a lens exposed on the design surface; and a lens housing, disposed at vehicle inside relative to the lens, for holding the lens, wherein the lens and the lens housing are covered with the gutter side wall portion and the gutter bottom wall portion, from vehicle inside.

If the lens alone is arranged to extend to the flange portion, a member inside the lens is visible from the vehicle outside due to the transparency or translucency of the lens, impairing the vehicular appearance design. Thus, it is necessary to apply a coating to hide the portion visible from the vehicle outside, but this creates a harmful effect of increasing the cost and the number of manufacturing processes. According to the above structure, the gutter flange portion is connected with the inclined flange portion, and the lens and the lens housing are covered by the gutter side wall portion and the gutter bottom wall portion from the vehicle inside.

Thereby, the lens and the lens housing can be arranged to extend to the flange portion, so that the gutter panel positioned inside the lens is invisible from the vehicle outside, not impairing the appearance design of the vehicle. Thus, a coating is not conducted, and thereby the cost and the number of manufacturing processes are prevented from increasing.

Moreover, it is preferred that the design part installation structure for the vehicle is structured such that the lens comprises a lens inclined portion disposed at an end thereof adjacent to the inclined flange portion and the gutter flange portion, the lens inclined portion inclining toward the vehicle outside as a position thereon shifts toward the inclined flange portion and the gutter flange portion.

According to this structure, the lens includes the lens inclined portion that is disposed at the end adjacent to the inclined flange portion and the gutter flange portion and inclines toward the vehicle outside as a position thereon shifts toward the inclined flange portion and the gutter flange portion, and thereby an interference of the lens with the inclined flange portion and the gutter flange portion is prevented.

Advantageous Effects of Invention

The present invention provides a design part installation structure for a vehicle capable of reducing the elongation percentage of the flange portion, while also increasing the degree of freedom for the curvature of the curved line segment.

In addition, the present invention provides a design part installation structure for a vehicle capable of suppressing an increase in the cost and the number of manufacturing processes, while also improving the appearance design.

BRIEF DESCRIPTION OF THE DRAWINGS

FIG. 2 is a cross-sectional view taken along line I-I of FIG. 1.

FIG. 4 is a perspective view of the left-rear side portion of the vehicle as seen from obliquely leftward and rearward.

DETAILED DESCRIPTION OF THE INVENTION

Figure 1:
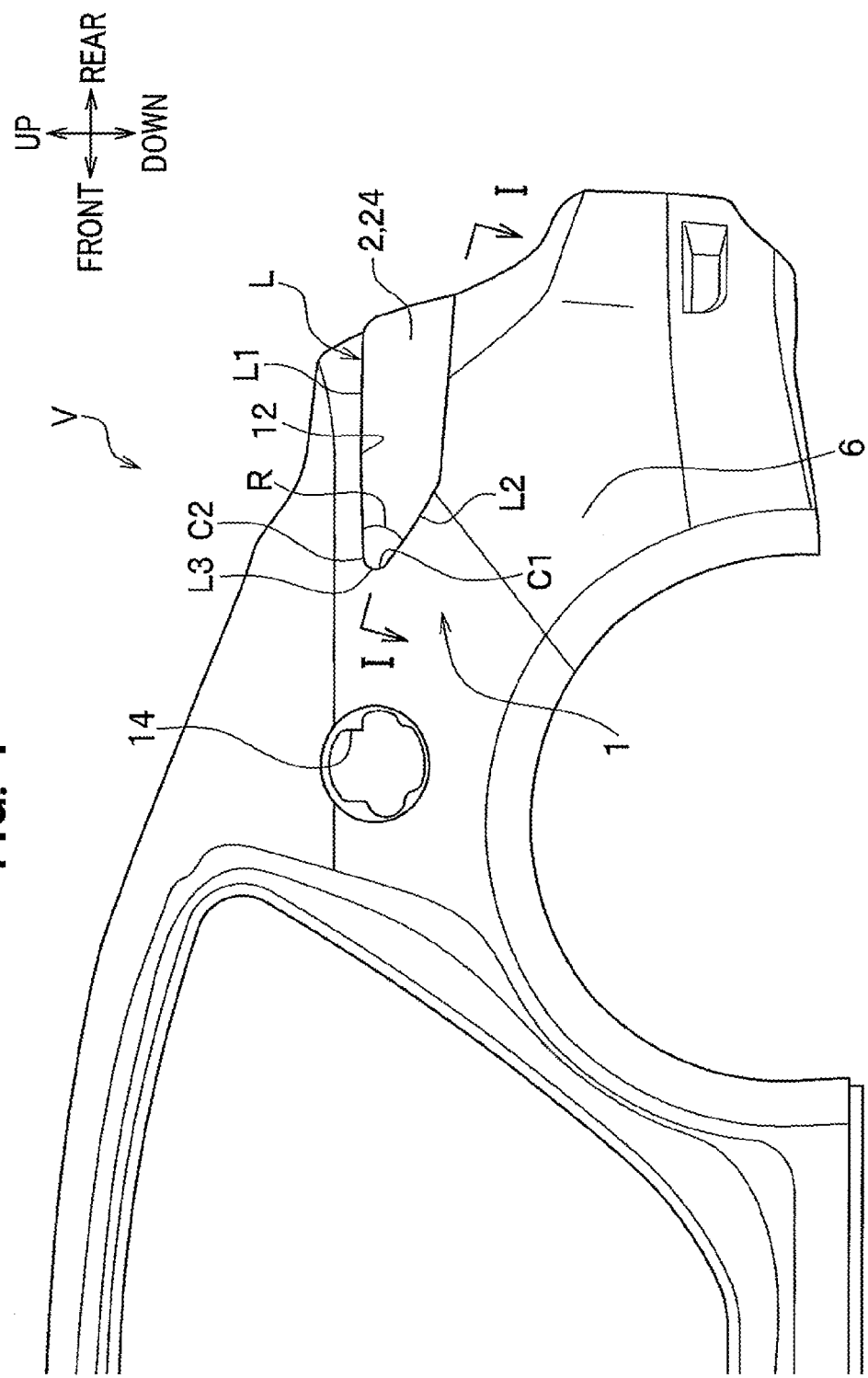
FIG. 1 is a partially omitted side view illustrating a left-rear side portion of a vehicle provided with a design part installation structure of a vehicle.

An embodiment of the present invention will be described in detail with reference to the drawings. In the description, the same reference numerals are given to the same elements, and redundant description is omitted. In the present embodiment, when directions are referred, the description is made with reference to "front", "rear", "up", "down", "left" and "right" of a vehicle V. It is noted that, since both left and right rear side portions of the vehicle V are substantially symmetric, the below description is made of the left-rear side portion only, and description of the right-rear side portion is omitted.

Figure 3A:
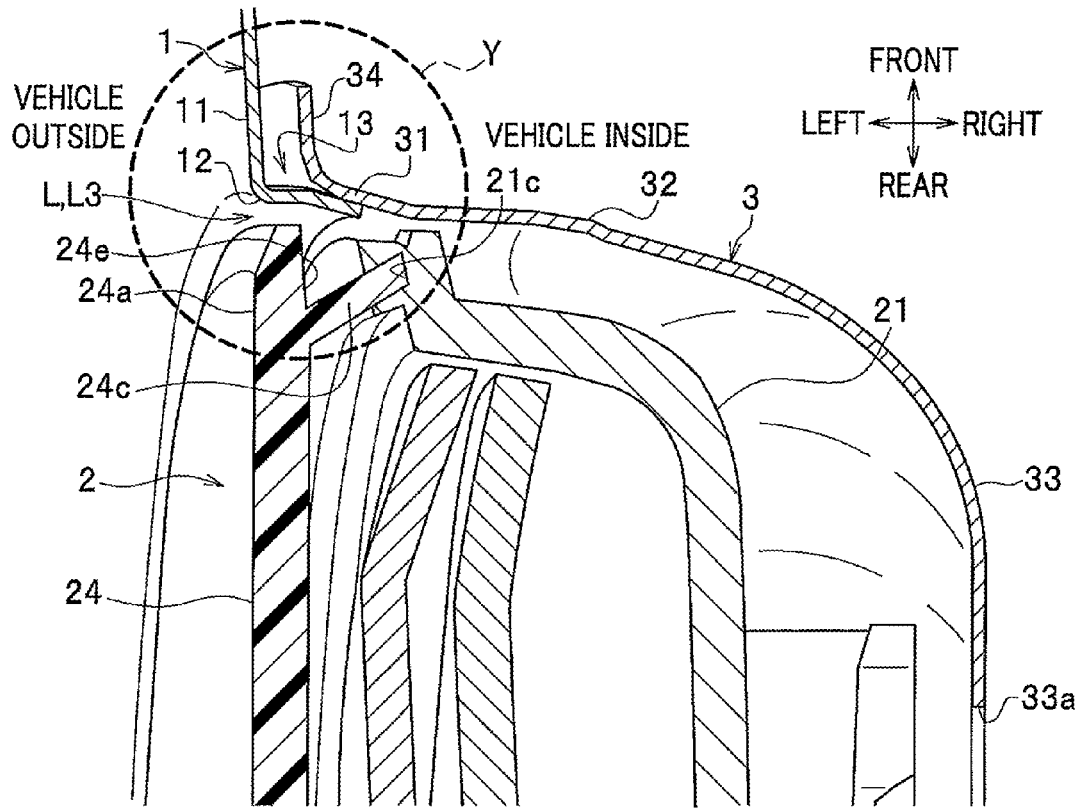
FIG. 3A is an enlarged view of region X of FIG. 2.
Figure 3B:
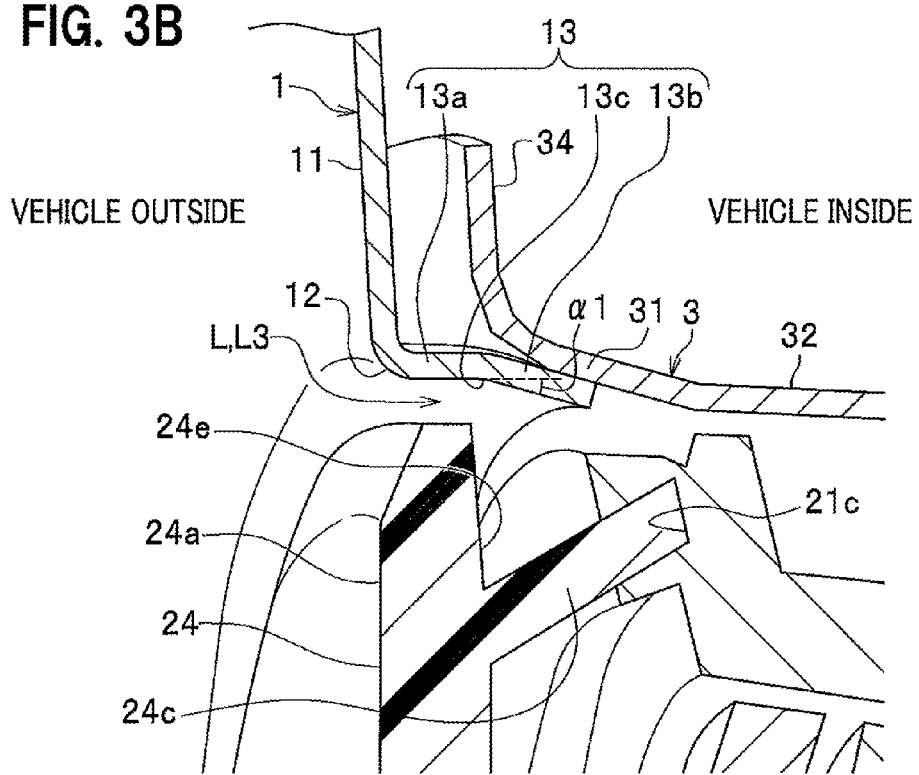
FIG. 3B is an enlarged view of region Y of FIG. 3A.
Figure 5:
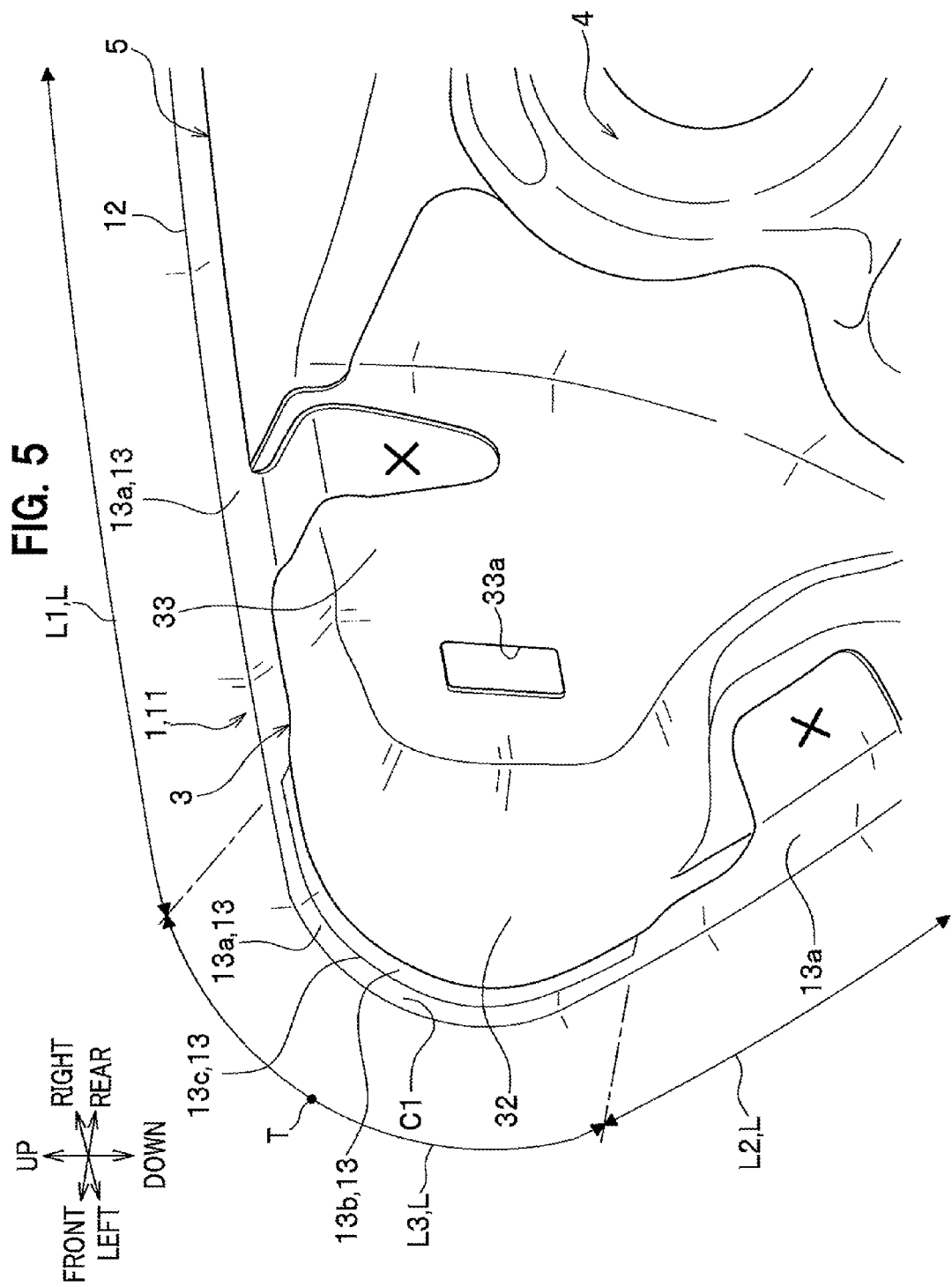
FIG. 5 is an enlarged view of region Z of FIG. 4.

FIG. 1 is a partially omitted side view illustrating the left-rear side portion of a vehicle V provided with a design part installation structure of a vehicle. FIG. 2 is a cross-sectional view taken along line I-I of FIG. 1. FIG. 3A is an enlarged view of region X of FIG. 2, and FIG. 3B is an enlarged view of region Y of FIG. 3A. FIG. 4 is a perspective view of the left-rear side portion of the vehicle V as seen from obliquely leftward and rearward. FIG. 5 is an enlarged view of region Z of FIG. 4. It is noted that, FIG. 4 and FIG. 5 are illustrated without a lamp body 2 for convenience of explanation.

As shown in FIG. 1 and FIG. 4, the vehicle V mainly comprises: an outer panel 1, a lamp body 2, a gutter panel 3, a rear combination lower panel 4, and a rear combination upper panel 5. As shown in FIG. 1, a parting line L with a certain width is formed between the outer panel 1 and the lamp body 2. The lamp body 2 is formed with a corner portion C2 having a certain angle R, and the outer panel 1 is formed with a corner portion C1 corresponding to the corner portion C2.

<Outer Panel 1>

The outer panel 1, a panel of an outer plate, is a plate-like steel member defining a design surface (external surface) of the vehicle V. As shown in FIG. 1, FIG. 4 and FIG. 5, the outer panel 1 comprises a main body 11, an installation section 12 and a flange portion 13.

The main body 11 is a section defining the design surface of the vehicle V.

The installation section 12 is a section which opens laterally and in which the lamp body 2, the gutter panel 3, the rear combination lower panel 4 and the rear combination upper panel 5 are installed.

As shown in FIG. 4 and FIG. 5, the flange portion 13 is formed so as to extend from a periphery of the installation section 12 toward the vehicle inside. As shown in FIGS. 3A and 3B, the flange portion 13 is composed of an orthogonal flange portion 13a, an inclined flange portion 13b and a curved portion 13c.

The orthogonal flange portion 13a is a portion formed so as to extend from the periphery of the installation section 12 toward the vehicle inside, and orthogonal to the main body 11. The inclined flange portion 13b is a portion formed so as to extend from an extending end of the orthogonal flange portion 13a toward the vehicle inside, and formed so as to incline at a certain angle relative to the orthogonal flange portion 13a. The inclined flange portion 13b inclines toward the lamp body 2 as a position thereon shifts in the direction from the vehicle outside to the vehicle inside. The curved portion 13c is a portion formed so as to smoothly curve at a bent portion between the orthogonal flange portion 13a and the inclined flange portion 13b.

The orthogonal flange portion 13a, the inclined flange portion 13b and the parting line L will be described later in detail with reference to FIG. 5.

As shown in FIG. 1 and FIG. 4, the outer panel 1 is also provided with a fuel opening section 14 to which a fuel cap (not shown) is attached in a detachable manner, a rear bumper face attachment portions 15, 15 to which a rear bumper face 6 is attached, and others, all in a manner extending therethrough.

<Gutter Panel>

As shown in FIG. 4, the gutter panel 3 is a plate-like steel member disposed adjacent to the corner portion C1 and connected with the outer panel 1 by welding. As shown in FIG. 3A, the gutter panel 3 inclines along the inclined flange portion 13b, and comprises: a gutter flange portion 31 connected with the inclined flange portion 13b by welding; a gutter side wall portion 32 extending from a vehicle inside end of the gutter flange portion 31 toward the vehicle inside; a gutter bottom wall portion 33 extending from a vehicle inside end of the gutter side wall portion 32 inwardly of the installation section 12; and an extending flange portion 34 extending from the vehicle outside end of the gutter flange portion 31 along the outer panel 1.

The gutter side wall portion 32 and the gutter bottom wall portion 33 cover portions (front end portions) of a lens 24 and a lens housing 21 of the lamp body 2, both described later, from the vehicle inside. As shown in FIG. 5, the gutter bottom wall portion 33 is provided with a rectangular attachment hole 33a extending therethrough. It is noted that, when the lens housing 21 is fixed on the gutter bottom wall portion 33, both members are connected to each other by means of clips (not shown) using the attachment hole 33a. The extending flange portion 34 is placed adjacent to and away a certain distance from a back surface of the outer panel 1.

<Rear Combination Lower Panel>

As shown in FIG. 4, the rear combination lower panel 4 is a plate-like steel member disposed rearwardly of the gutter panel 3 and connected with the gutter panel 3 by welding. The rear combination lower panel 4 is provided, at a front end (one end) thereof, with a circular insertion hole 41 extending therethrough.

<Rear Combination Upper Panel>

As shown in FIG. 4, the rear combination upper panel 5 is a plate-like steel member disposed rearwardly of the gutter panel 3 and upwardly of the rear combination lower panel 4, and connected with the gutter panel 3 and the rear combination lower panel 4 by welding.

<Lamp Body>

As shown in FIG. 2, the lamp body 2 comprises: a lens housing 21; a radiation light source 22 held by the lens housing 21; a reflector 23 for reflecting a light from the radiation light source 22; and a lens 24 covering the radiation light source 22 and the reflector 23 from the vehicle outside.

The lens housing 21 is a plastic member for holding the radiation light source 22 and the reflector 23 and for fixing the lens 24. Where appropriate in the lens housing 21, an insertion portion 21a is formed so as to protrude frontward to be inserted into the insertion hole 41 of the rear combination lower panel 4. The insertion portion 21a and the insertion hole 41 serve as a means for positioning the lens housing 21 relative to the rear combination lower panel 4. In addition, where appropriate in the lens housing 21, an insertion hole 21b, into which a base end of the radiation light source 22 is inserted, is formed so as to extend through the lens housing 21 in the front-rear direction. At front and rear ends of the lens housing 21, trench portions 21c, 21d are formed in a recessed manner.

The radiation light source 22 is a component that is inserted and held in the insertion hole 21b of the lens housing 21 and irradiates the rearward of the vehicle V.

The reflector 23 is a member that is disposed in the lens housing 21 to reflect a light from the radiation light source 22. The reflector 23 has a hole section 23a, from which a head of the radiation light source 22 protrudes, formed therethrough in the front-rear direction.

The lens 24 is a member that has a shape corresponding to the installation section 12 (refer to FIG. 1) and is capable of transmitting therethrough a light radiated from the radiation light source 22. As shown in FIG. 2, FIG. 3A and FIG. 3B, at the front and rear ends 24a, 24b of the lens 24, positioning portions 24c, 24d are formed so as to protrude toward the vehicle inside, and are inserted and fixed in the trench portions 21c, 21d of the lens housing 21. As shown in FIG. 3B, at the front end 24a of the lens 24 (specifically, at a part anterior to the root of the positioning portion 24c), a lens inclined portion 24e is formed which inclines toward the vehicle outside as a position thereon shifts toward the flange portion 13 and the gutter flange portion 31.

Next, the orthogonal flange portion 13a, the inclined flange portion 13b and the parting line L will be described in detail with reference to FIG. 5. It is noted that, in FIG. 5, a first parting line segment L1 to a third parting line segment L3 are indicated at positions a certain distance away from their actual positions for convenience of explanation. In addition, "X" in FIG. 5 denotes a welding spot between the outer panel 1 and the gutter panel 3.

<Parting Line>

The parting line L mainly comprises: a substantially linear first parting line segment L1 that extends substantially in the front-rear direction; a substantially linear second parting line segment L2 that extends below the first parting line segment L1 in the direction crossing the first parting line segment L1; and a curved third parting line segment L3 formed between the first parting line segment L1 and the second parting line segment L2. The angle formed between the first parting line segment L1 and the second parting line segment L2 corresponds to the angle R (refer to FIG. 1) of the corner portion C2. The third parting line segment L3 corresponds to "a curved line segment" in the claims.

<Orthogonal Flange Portion, Inclined Flange Portion>

The orthogonal flange portion 13a is formed over the entire length from a section corresponding to the first parting line segment L1 to a section corresponding to the third parting line segment L3 of the outer panel 1. The inclined flange portion 13b is formed over the entire length of a section corresponding to the third parting line segment L3 of the outer panel 1. As shown in FIG. 5, the angle α1 (refer to FIG. 3B) of the inclined flange portion 13b relative to the orthogonal flange portion 13a gradually becomes smaller as a position thereon shifts from a point of the outer panel 1 corresponding to the top T at the center in the longitudinal direction of the third parting line segment L3, toward the first parting line segment L1 and the second parting line segment L2. Then, the inclined flange portion 13b smoothly continues to the orthogonal flange portions 13a of the outer panel 1 corresponding to the first parting line segment L1 and the second parting line segment L2.

The design part installation structure for the vehicle V according to the present embodiment is basically structured as above. Next, its behavior and effect will be described.

In the present embodiment, the section corresponding to the curved third parting line segment L3 is provided with the inclined flange portion 13b disposed at the extending end of the orthogonal flange portion 13a, and thereby the elongation percentage at the distal end of the flange portion 13 is reduced as compared to a case where the angle of the entire flange portion relative to the main body is set at 90 degree.

In addition, since the inclined flange portion 13b is provided at the extending end of the orthogonal flange portion 13a, the height of the entire flange portion 13 including the orthogonal flange portion 13a and the inclined flange portion 13b is reduced, even if a margin for connecting with the gutter panel 3 is provided, as compared to a case where the angle of the entire flange portion relative to the main body is set at 90 degree. Thereby, even if the curvature of the third parting line segment L3 (the angle R formed between the first parting line segment L1 and the second parting line segment L2) is acute, the flange portion 13 is formed preferably.

In the present embodiment, since the orthogonal flange portion 13a is provided between the main body 11 and the inclined flange portion 13b, the width of the parting line L (the width of the gap between the outer panel 1 and the lamp body 2) is equalized. Thereby, the appearance design is improved, and a seal or the like as a hiding member becomes unnecessary to prevent an increase in the cost and the number of manufacturing processes.

In the present embodiment, since the angle α1 of the inclined flange portion 13b relative to the orthogonal flange portion 13a gradually becomes smaller as a position thereon shifts from a point of the outer panel 1 corresponding to the top T at the center in the longitudinal direction of the third parting line segment L3 toward the first parting line segment L1 and the second parting line segment L2, the angle α1 of the inclined flange portion 13b is set according to the elongation percentage of respective portions so as to preferably reduce the elongation percentage of the respective portions. That is, at the point corresponding to the top T where the elongation percentage is relatively large, the angle α1 of the inclined flange portion 13b is increased to reduce the elongation percentage. On the other hand, at the places adjacent to the first parting line segment L1 and the second parting line segment L2 where the elongation percentage is relatively small, the angle α1 of the inclined flange portion 13b need not be larger than necessary so as to reduce the effect on the appearance design.

In the present embodiment, since the inclined flange portion 13b at a section corresponding to the third parting line segment L3 smoothly continues to the orthogonal flange portions 13a adjacent to the first and second parting line segments L1, L2, no sharply bent portion (bent section) is formed therebetween. Thereby, the elongation percentage of the flange portion 13 at the time of press forming is reduced, and thus the flange portion 13 is formed preferably.

In the present embodiment, the outer panel 1 includes the curved portion 13c formed so as to curve between the orthogonal flange portion 13a and the inclined flange portion 13b, and thereby is structured to be bent gradually (gently) from the orthogonal flange portion 13a to the inclined flange portion 13b, so that no sharply bent portion is formed therebetween. Thereby, the elongation percentage of the flange portion 13 at the time of press forming is decreased, and thus the flange portion 13 is formed preferably.

In the present embodiment, the gutter flange portion 31 is connected with the inclined flange portion 13b, and the lens 24 and the lens housing 21 are partially covered by the gutter side wall portion 32 and the gutter bottom wall portion 33 from the vehicle inside. Thereby, the lens 24 and the lens housing 21 are arranged to extend to the flange portion 13, so that the gutter panel 3 positioned inside the lens 24 is invisible from the vehicle outside, not impairing the appearance design of the vehicle V. Thus, a coating for hiding the gutter panel 3 is not conducted, and thereby the cost and the number of manufacturing processes are prevented from increasing.

In the present embodiment, the lens 24 includes the lens inclined portion 24e which is disposed at the end adjacent to the inclined flange portion 13b and the gutter flange portion 31 and which inclines toward the vehicle outside as a position thereon shifts toward the inclined flange portion 13b and the gutter flange portion 31, and thereby an interference of the lens 24 with the inclined flange portion 13b and the gutter flange portion 31 is prevented.

In the above, the embodiment of the present invention is described in detail with reference to the drawings. However, the present invention is not limited thereto, but may be changed as appropriate within the scope not departing from the spirit of the invention.

In the present embodiment, the smoothly curved portion 13c is formed at the bent portion between the orthogonal flange portion 13a and the inclined flange portion 13b. However, a sharply curved portion may be formed.

In the present embodiment, the inclined flange portion 13b is structured to extend over the entire length of the section corresponding to the third parting line segment L3 of the outer panel 1. However, it may be structured to extend over the entire length of the sections corresponding to the first parting line segment L1 to the third parting line segment L3 of the outer panel 1.

Next, the behavior and effect of the design part installation structure for the vehicle V of the present invention will be described in more detail with reference to FIGS. 6 to 8 by comparing the working example and the comparative example.

Figure 6:
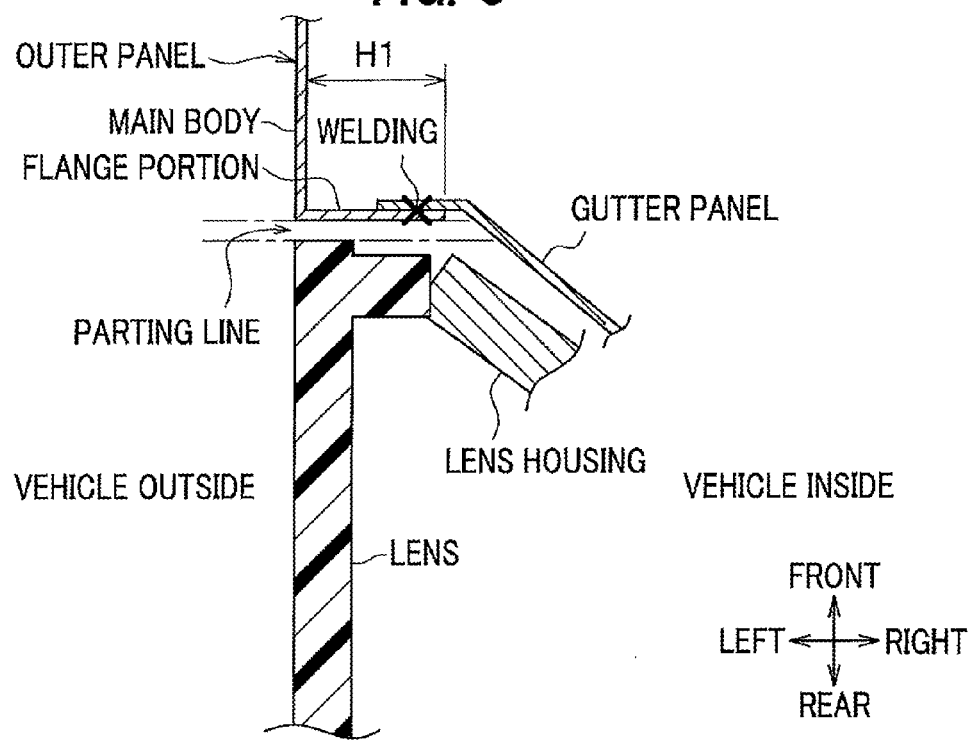
FIG. 6 is a cross-sectional view illustrating a left-rear side portion of a vehicle according to comparative example 1 which is not the present invention.

In the drawings referred, FIG. 6 is a cross-sectional view illustrating a left-rear side portion of a vehicle according to comparative example 1 which is not the present invention. FIG. 7 is a cross-sectional view illustrating a left-rear side portion of a vehicle according to comparative example 2 which is not the present invention. FIG. 8 is a cross-sectional view illustrating a left-rear side portion of a vehicle according to comparative example 3 which is not the present invention. It is noted that FIGS. 6 to 8 are cross-sectional views comparable to the cross-sectional view taken along line I-I of FIG. 1.

Working Example

The present working example is structured in the same manner as the above embodiment.

Comparative Example 1

As shown in FIG. 6, in this comparative example, the flange portion is structured so as to extend from the main body toward the vehicle inside, orthogonally to the main body. In addition, the gutter panel is connected with one end of the flange portion by welding, and the gutter panel is structured to cover the lens and the lens housing partially.

Comparative Example 2

Figure 7:
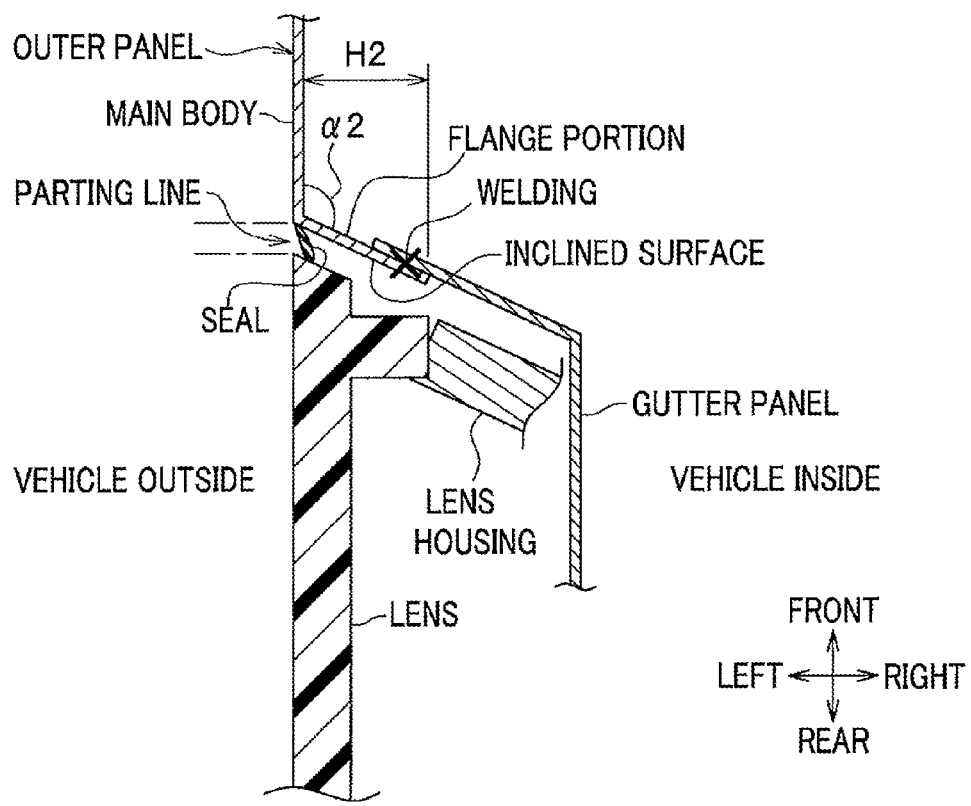
FIG. 7 is a cross-sectional view illustrating a left-rear side portion of a vehicle according to comparative example 2 which is not the present invention.

As shown in FIG. 7, in this comparative example, the flange portion is formed so as to extend from the main body toward the vehicle inside, and is structured to incline relative to the main body at an angle α2 greater than 90 degree. In addition, the gutter panel is connected with one end of the flange portion by welding, and the gutter panel is structured to cover the lens and the lens housing partially.

Comparative Example 3

Figure 8:
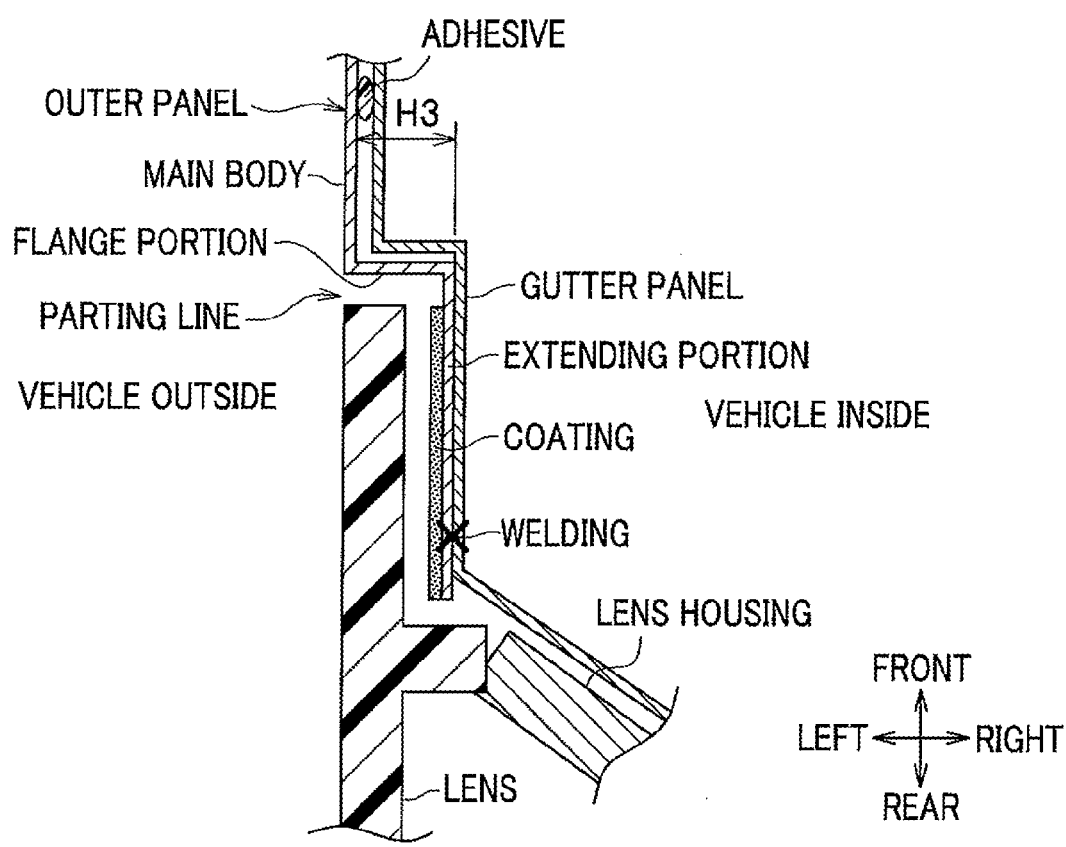
FIG. 8 is a cross-sectional view illustrating a left-rear side portion of a vehicle according to comparative example 3 which is not the present invention.

As shown in FIG. 8, in this comparative example, the flange portion is formed so as to extend from the main body toward the vehicle inside, orthogonally to the main body. In addition, an extending portion is provided which extends orthogonally from the extending end of the flange portion. The gutter panel is arranged along the main body, the flange portion and the extending portion. One end of the gutter panel is connected with the main body by means of an adhesive, and the other end of the gutter panel is connected with the extending portion by welding. Further, the lens is structured so as to extend to the flange portion.

Comparison Between Working Example and Comparative Example 1

In general, the more acute the angle R (curvature of the third parting line segment L3) of the corner portion C2 (refer to FIG. 1) is, the greater the elongation percentage of the flange portion 13 in the section corresponding to the corner portion C2 becomes. Also, the higher the flange portion 13 is, the greater the elongation percentage of the flange portion 13 is. Further, the smaller the angle of the flange portion 13 relative to the main body 11 is, the greater the elongation percentage of the flange portion 13 is. If the elongation percentage of the flange portion 13 is large, the member is easily elongated to a large extent, which might cause a crack or the like when the elongation limit is reached.

As shown in FIG. 6, in comparative example 1, it is necessary to increase the length of the flange portion to secure the margin for connecting with the gutter panel. Accordingly, the flange portion is arranged orthogonal to the main body, and the height of the flange portion H1 increases inevitably, which result in an increase in the elongation percentage of the flange portion. Thus, since an enlargement of the angle R of the corner portion C2 is necessary to reduce the elongation percentage of the flange portion, the scope of the angle R of the corner portion C2 is limited and the degree of freedom in designing the vehicle is reduced.

In contrast, in the working example, since the inclined flange portion 13b is provided at the extending end of the orthogonal flange portion 13a as shown in FIG. 3B, the elongation percentage at the distal end of the flange portion 13 decreases, as compared to a case where the angle of the entire flange portion 13 relative to the main body 11 is set at 90 degree.

Also, even if the length of the flange portion 13 is increased to secure the margin for connecting with the gutter panel 3, since the inclined flange portion 13b is provided at the extending end of the orthogonal flange portion 13a, the height of the entire flange portion 13 including the orthogonal flange portion 13a and the inclined flange portion 13b decreases as compared to a case where the angle of the entire flange portion 13 relative to the main body 11 is set at 90 degree. Thereby, even if the angle R of the corner portion C2 (the curvature of the third parting line segment L3) is decreased, the flange portion 13 is formed preferably so as to increase the degree of freedom in the size of the angle R of the corner portion C2 and therefore the degree of freedom in designing the vehicle, as compared to the comparative example 1.

Comparison Between Working Example and Comparative Example 2

As shown in FIG. 7, in comparative example 2, the flange portion inclines at an angle α2, which is larger than 90 degree, relative to the main body. Thereby, the inclined surface of the flange portion is exposed on the vehicle outside from the parting line, so that the parting line at the corner portion C2 looks narrow and the width of the parting line at the corner portion C2 is unequalized from the width of the parting line at other portions, impairing the appearance design. Thus, one can conceive of providing a seal or the like to hide the uneven parting line, but this creates a harmful effect of increasing the cost and the number of manufacturing processes.

In contrast, in the working example, since the orthogonal flange portion 13a is provided between the main body 11 and the inclined flange portion 13b as shown in FIG. 3B, the width of the third parting line segment L3 is set at an equal size with the widths of the first parting line segment L1 and the second parting line segment L2. Thereby, the appearance design is improved, and the cost and the number of manufacturing processes are prevented from increasing due to needlessness of a seal or the like as a hiding member.

Comparison Between Working Example and Comparative Example 3

In comparative example 3, since the height of the flange portion is reduced and the extending portion is provided, the lens extends to the flange portion while the housing does not extend to the flange portion. Because the lens is a transparent or translucent member, the extending portion of the outer panel positioned inside the lens is visible from the vehicle outside, impairing the vehicular appearance design. Thus, it is necessary to apply a coating to hide the portion visible from the vehicle outside, but this creates a harmful effect of increasing the cost and the number of manufacturing processes.

In contrast, in the working example, the gutter panel 3 is connected with the inclined flange portion 13b via the gutter flange portion 31, and the lens 24 and the lens housing 21 are partially covered by the gutter side wall portion 32 and the gutter bottom wall portion 33 from the vehicle inside. Thereby, the lens 24 and the lens housing 21 can be arranged to extend to the flange portion 13, and the gutter bottom wall portion 33 positioned inside the lens 24 is not visible from the vehicle outside, not impairing the appearance design of the vehicle V. Thus, the coating is unnecessary, and therefore the cost and the number of manufacturing processes are prevented from increasing.

DESCRIPTION OF REFERENCE NUMERALS

V vehicle
1 outer panel (outer plate panel)
11 main body (design surface)
12 installation section
13 flange portion
13a orthogonal flange portion
13b inclined flange portion
13c curved portion
2 lamp body (design part)
21 lens housing
24 lens
24e lens inclined portion
3 gutter panel
31 gutter flange portion
32 gutter side wall portion
33 gutter bottom wall portion
C1 corner portion
C2 corner portion
R angle
α1 angle
L parting line
L1 first parting line segment
L2 second parting line segment
L3 third parting line segment (curved line segment)
T top

What is claimed is:

1. A design part installation structure for a vehicle, comprising:
    a design part exposed on a design surface of the vehicle;
    an outer plate panel including an installation section for installing the design part, the outer plate panel defining the design surface; and
    a parting line formed between the design part and the outer plate panel,
    wherein the parting line includes a curved line segment,
    wherein the outer plate panel comprises:
        an orthogonal flange portion disposed in a section corresponding to the curved line segment so as to extend from the installation section toward vehicle inside, the orthogonal flange portion being orthogonal to the design surface; and
        an inclined flange portion disposed in the section corresponding to the curved line segment so as to extend from an extending end of the orthogonal flange portion toward the vehicle cabin, wherein the inclined flange portion inclines toward the design part as a position thereon shifts in a direction from vehicle outside to vehicle inside.

2. The design part installation structure for the vehicle according to claim 1,
    wherein the parting line includes:
        a first parting line segment;
        a second parting line segment extending in a direction crossing the first parting line segment; and
        a third parting line segment formed between the first parting line segment and the second parting line segment so as to define the curved line segment,
    wherein the orthogonal flange portion is disposed in sections corresponding to the first parting line segment, the second parting line segment and the third parting line segment,
    wherein the inclined flange portion extends on the outer plate panel along the third parting line segment toward the first parting line segment and the second parting line segment.

3. The design part installation structure for the vehicle according to claim 2,
    wherein the inclined flange portion smoothly continues to the orthogonal flange portions, adjacent to the first and second parting line segments, of the outer plate panel.

4. The design part installation structure for the vehicle according to claim 3,
wherein the outer plate panel comprises a curved portion formed so as to curve between the orthogonal flange portion and the inclined flange portion.

5. The design part installation structure for the vehicle according to claim 4, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens,
wherein the lens and the lens housing are covered with the gutter side wall portion and the gutter bottom wall portion, from vehicle inside.

6. The design part installation structure for the vehicle according to claim 5,
wherein the lens comprises a lens inclined portion disposed at an end thereof adjacent to and directed toward the inclined flange portion and the gutter flange portion, the lens inclined portion inclining toward vehicle outside.

7. The design part installation structure for the vehicle according to claim 3, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens,
wherein the lens and the lens housing are covered with the gutter side wall portion and the gutter bottom wall portion, from vehicle inside.

8. The design part installation structure for the vehicle according to claim 7,
wherein the lens comprises a lens inclined portion disposed at an end thereof adjacent to and directed toward the inclined flange portion and the gutter flange portion, the lens inclined portion inclining toward vehicle outside.

9. The design part installation structure for the vehicle according to claim 2,
wherein the outer plate panel comprises a curved portion formed so as to curve between the orthogonal flange portion and the inclined flange portion.

10. The design part installation structure for the vehicle according to claim 9, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens,
wherein the lens and the lens housing are covered with the gutter side wall portion and the gutter bottom wall portion, from vehicle inside.

11. The design part installation structure for the vehicle according to claim 10,
wherein the lens comprises a lens inclined portion disposed at an end thereof adjacent to and directed toward the inclined flange portion and the gutter flange portion, the lens inclined portion inclining toward vehicle outside.

12. The design part installation structure for the vehicle according to claim 2, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens,
wherein the lens and the lens housing are covered with the gutter side wall portion and the gutter bottom wall portion, from vehicle inside.

13. The design part installation structure for the vehicle according to claim 12,
wherein the lens comprises a lens inclined portion disposed at an end thereof adjacent to and directed toward the inclined flange portion and the gutter flange portion, the lens inclined portion inclining toward vehicle outside.

14. The design part installation structure for the vehicle according to claim 1,
wherein the outer plate panel comprises a curved portion formed so as to curve between the orthogonal flange portion and the inclined flange portion.

15. The design part installation structure for the vehicle according to claim 14, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens, wherein the lens and the lens housing are covered with the gutter side wall portion and the gutter bottom wall portion, from vehicle inside.

16. The design part installation structure for the vehicle according to claim 15,
wherein the lens comprises a lens inclined portion disposed at an end thereof adjacent to and directed toward the inclined flange portion and the gutter flange portion, the lens inclined portion inclining toward vehicle outside.

17. The design part installation structure for the vehicle according to claim 1, further comprising
a gutter panel including:
a gutter flange portion inclining along the inclined flange portion and connected to the inclined flange portion,
a gutter side wall portion extending from a vehicle inside end of the gutter flange portion toward vehicle inside, and
a gutter bottom wall portion extending from a vehicle inside end of the gutter side wall portion inwardly of the installation section,
wherein the design part is a lamp body including:
a lens exposed on the design surface; and
a lens housing, disposed at vehicle inside relative to the lens, for holding the lens,
wherein the lens and the lens housing are covered with the gutter side wall portion and the gutter bottom wall portion, from vehicle inside.

18. The design part installation structure for the vehicle according to claim 17,
wherein the lens comprises a lens inclined portion disposed at an end thereof adjacent to and directed toward the inclined flange portion and the gutter flange portion, the lens inclined portion inclining toward vehicle outside.

* * * * *